United States Patent [19]

Lehmann

[11] 4,360,727
[45] Nov. 23, 1982

[54] PAYMENT VOUCHER

[75] Inventor: Roger Lehmann, Paris, France

[73] Assignee: Compagnie Generale d'Automatise Societe Anonyme dite, Paris, France

[21] Appl. No.: 252,547

[22] Filed: Apr. 9, 1981

[51] Int. Cl.³ .......................................... G06K 19/06
[52] U.S. Cl. .................................. 235/441; 235/487; 235/492
[58] Field of Search ...................... 235/441, 487, 492; 340/825.33

[56] References Cited

U.S. PATENT DOCUMENTS 3,806,874  4/1974  Ehrat .............................. 340/825.33

FOREIGN PATENT DOCUMENTS 2717106  2/1978  Fed. Rep. of Germany ...... 235/441
2353103  12/1977  France ............................. 235/441

Primary Examiner—Harold I. Pitts
Attorney, Agent, or Firm—Sughrue, Mion, Zinn, Macpeak & Seas

[57] ABSTRACT

The invention comes within the field of bank transactions, a payment voucher which includes a hollow body in which an integrated circuit is housed, said integrated circuit constituting a memory, wherein said hollow body includes an end which bears contacts designed to co-operate with a read-and-debit machine, said contacts being connected inside the hollow body to corresponding contacts of the integrated circuit and wherein access to the integrated circuit from outside the body is provided by a cover connected to an internal security device which prevents normal use of the payment voucher in the event the said cover is opened. The invention applies to the payment of purchases.

3 Claims, 3 Drawing Figures

PAYMENT VOUCHER

The present invention relates to a payment voucher.

BACKGROUND OF THE INVENTION

There have already been proposals to use a card which bears an integrated circuit to constitute a memory as a payment voucher. Said memory is programmed when it is manufactured so as to represent a sum of money. Banks distribute cards to their customers with values corresponding to sums paid in to the banks by said customers. The cards are designed for use in shops. The user inserts his card in a read-and-debit machine which performs a debit operation corresponding to the purchase.

The operation can be repeated until the credit memorized in the integrated circuits is expended. The card must then be changed. Now, producing such cards sets tricky problems since integrated circuits cannot be immediately incorporated in cards such as presently known credit or bank service cards and further, there are difficulties concerning the output contacts which are to co-operate with the reading machines.

Therefore efforts have also been made to locate such integrated circuits in objects such as rings or fountain-pens where one integrated circuit could be replaced by another when the memory of the circuit has expended all its credit. However, such systems are dangerous since they allow defrauders who manage to obtain copies of integrated circuits to refill the ring or the fountain-pen.

SUMMARY OF THE INVENTION

The invention aims to mitigate this disadvantage and provies a payment voucher which includes a hollow body in which an integrated circuit is housed, said integrated circuit constituting a memory, which said hollow body includes an end which bears contacts designed to co-operate with a read-and-debit machine, said contacts being connected inside the hollow body to corresponding contacts of the integrated circuit and wherein access to the integrated circuit from outside the body is provided by a cover connected to an internal security device which prevents normal use of the payment voucher in the event the said cover is opened.

According to one embodiment of the invention, said security device includes a replaceable wire connected between two terminals, said wire being broken by the action of opening the cover, thereby cutting the electricity supply to the integrated circuit.

According to another advantageous embodiment of the present invention, said security device includes two contact studs connected to the plates of a capacitor which is at least partially charged when the payment voucher is in operating condition and which, when completely discharged, prevents operation of the payment voucher, said two contact studs being short-circuited when the cover is opened.

BRIEF DESCRIPTION OF THE DRAWINGS

The invention will be better understood from the description of two embodiments thereof given hereinafter with reference to the accompanying drawing in which.

DESCRIPTION OF PREFERRED EMBODIMENTS

Figure 1:
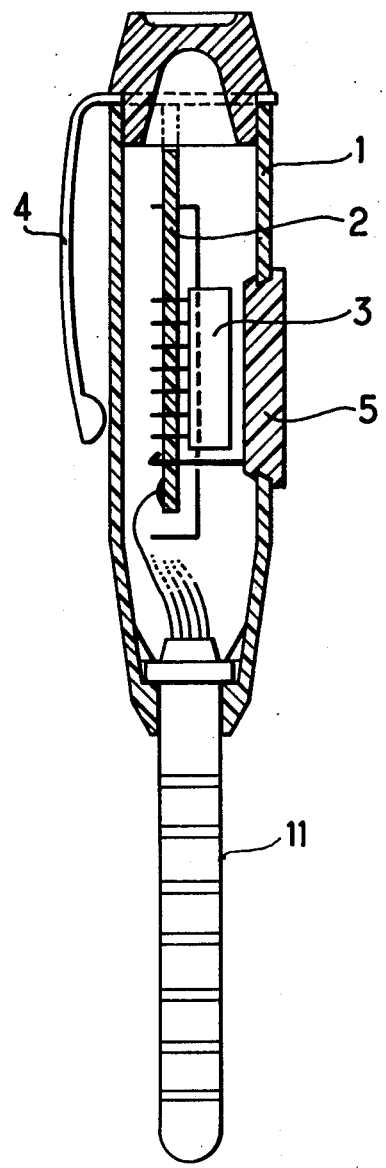
FIG. 1 shows schematically an enlarged sectional view of a payment voucher in accordance with the invention.

A payment voucher includes a hollow body 1 generally shaped like a fountain-pen. Inside it, there is a support 2 for an integrated circuit 3 which constitutes a memory, and which has an initial money value attributed to it. Thereafter, when the initial value is expended, and depending on the type memory it may need to be changed for a new memory or alternatively it may be "recharged". The support 2 has contacts into which are plugged contact pins in the form of "tabs" of an integrated circuit 3. The support 2 contacts are connected to a "jack" type contact pin 11 designed to co-operate with complementary contacts of a read-and-debit machine situated e.g. on a tradesman's premises. The body 1 includes a clip 4 to fix the object in a jacket pocket for example. The body 1 also has a cover or stopper 5 for access to the integrated circuit 3 so as to replace or recharge it. However, the cover 5 is integral with an internal security device so that if an unauthorized person opens the cover, the payment voucher becomes unusable without consulting a specialist.

Figure 2:
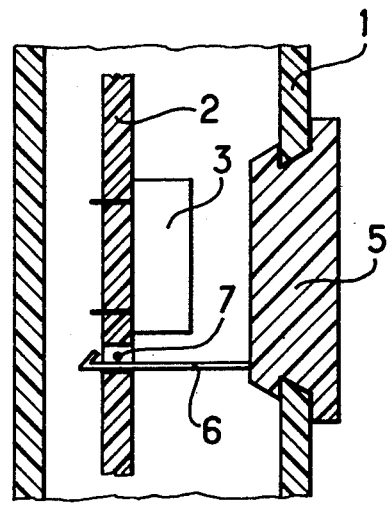
FIG. 2 is an enlarged sectional view which illustrates a detail of FIG. 1 showing an internal security device.

FIG. 2 illustrates a possible security device. This figure again shows the hollow body 1, the support 2 of the integrated circuit 3, and the access cover or stopper 5. The stopper 5 has a hook 6 which, when the stopper is removed, breaks a conductor wire 7 which can easily be replaced. For example, this wire can be constituted by a screw-in fuse like those found in trade. Breaking the wire prevents the normal operation of the circuit e.g. by cutting the electricity supply therefrom.

Figure 3:
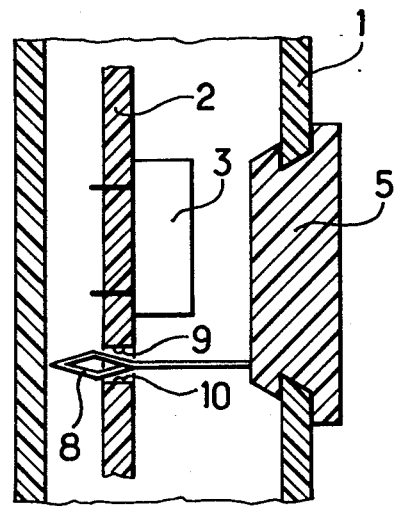
FIG. 3 illustrates a detail of FIG. 1 showing the internal security device in accordance with a different embodiment from that of FIG. 2.

FIG. 3 shows another variant of the security device in which the hook 6 is replaced by a spring conductor 8 which makes contact between two contact studs 9 and 10. When the payment voucher is credited (normally by a bank), a capacitor, not illustrated, whose plates are connected to the two contact studs 9 and 10 receives an electric charge which in renewed at each normal use of the voucher. In contrast, when the stopper 5 is removed, the capacitor is totally discharged by short-circuiting the contact studs 9 and 10. By means of a suitable connection, this can prevent the device from being useable thereafter.

I claim:

1. A payment voucher including a hollow body, an integrated circuit housed in said hollow body, said integrated circuit constituting a memory, said hollow body further including an end which bears contacts designed to co-operate with a read-and-debit machine, said contacts being connected inside the hollow body to corresponding contacts of the integrated circuit, a cover providing access to the integrated circuit from outside the body, the improvement wherein an internal security device is connected to said cover which prevents normal use of the payment voucher in the event said cover is opened.

2. A payment voucher according to claim 1, wherein said security device comprises a replaceable wire connected between two terminals of said integrated circuit, and means carried by said cover for breaking said wire by the action of opening the cover, thereby cutting the electricity supply to the integrated circuit.

3. A payment voucher according to claim 1, wherein said security device comprises two contact studs connected to the plates of a capacitor which is at least partially charged when the payment voucher is in operating condition and which, when completely discharged, prevents operation of the payment voucher, and means carried by said cover for short-circuiting said two contact studs when the cover is opened.

* * * * *